April 26, 1966     A. L. MILLER     3,247,969
SWIMMING POOL
Filed Aug. 28, 1961
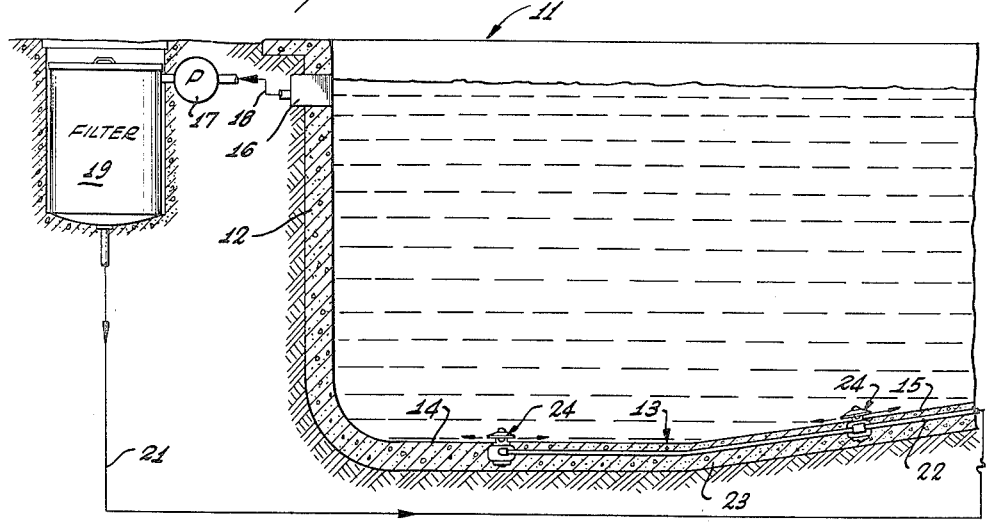
INVENTOR.
AVY L. MILLER United States Patent Office 3,247,969
Patented Apr. 26, 1966

3,247,969
SWIMMING POOL
Avy L. Miller, 13246 Saticoy St., North Hollywood, Calif.
Filed Aug. 28, 1961, Ser. No. 134,474
6 Claims. (Cl. 210—169)

The present invention relates generally to swimming pools, and more particularly to apparatus for cleaning the bottoms of swimming pools and securing a better mixture of incoming water and solutions with the water in the pool.

In the operation of artificial swimming pools, dust, dirt, and other contaminating materials are often blown or dropped into the pool. Material having a specific gravity less than water will float on the surface of the pool and may be removed by skimming. Material which goes into solution in the water in the pool may be removed, if desired, by suitable chemical treatment. Material which is in suspension in the water of the pool may be removed by filtration, and to effect this operation the water in the water in the pool is continually or periodically circulated through a filter to remove the suspended material therefrom.

Since the capacity of the filter is necessarily limited, circulation of water therethrough occurs in a flow volume small compared with the total volume of the pool, so that filtration of the entire volume of the pool takes a considerable period of time. The removal of all foreign matter requires an even greater period of time, since the filtered water is returned to the pool after passing through the filter to maintain the pool level substantially constant, so that the suspension in the pool may be looked upon as being constantly diluted by the returning filtered water. During this filtering period and when filtering is interrupted, the heavier particles suspended in the pool water will settle to the bottom of the pool, where they will accumulate as a sediment on the bottom surface. This is particularly true when the pool is not being used by bathers and on those bottom surfaces where bathers do not tread to stir up the settled material.

According to conventional practice in the operation of swimming pools, the foreign matter settling on the bottom of the pool is periodically removed by suction apparatus similar to vacuum cleaners which may be connected to the filter pump. This suction apparatus includes a suction nozzle which is moved across the entire bottom of the pool in an operation similar to the vacuum cleaning of a rug, and the operation consumes a considerable amount of time and involves a shutdown period for the pool.

According to the present invention, material which tends to settle to the bottom of the pool is stirred up during the filtering operation and again placed in suspension in the water of the pool so that it will be drawn off therewith and conducted to the filter for removal.

In the operation of swimming pools in cooler weather, the water of the pool is often heated while being circulated through the filter and returned to the pool to raise the temperature thereof. The present invention also serves to thoroughly mix the incoming heated water with the water in the pool to prevent local hot spots therein.

Further in the operation of swimming pools, it is desired to mix certain chemicals with the water in the pool to inhibit the growth of algae and kill bacteria therein, and the apparatus of the present invention can also be used to secure a more thorough mixture of the inserted chemicals with the water in the pool.

It is, therefore, an object of the present invention to provide a swimming pool with improved means for cleaning the bottom of the pool of foreign matter settling thereon.

Another object of this invention is the provision of an improved pool bottom cleaner which will prevent the settlement of foreign matter on the bottom of the pool and will stir up any settled matter to return it into suspension in the water of the pool.

A further object of this invention is the provision of a swimming pool filter system in which clean filtered water is returned to the pool across the bottom thereof to stir up settled materials and return them into suspension in the water of the pool.

A still further object of this invention is the provision of a circulating system for a swimming pool serving to mix incoming water and chemicals with a large volume of the water in the pool to lessen localized separation between the water in the pool and the incoming water.

These and other object and features of the invention will be readily apparent to those skilled in the art from the following specification and the appended drawing of a certain preferred embodiment of the invention, in which:

FIGURE 1 is a vertical sectional view for a swimming pool according to the present invention, with certain parts shown schematically;

FIGURE 2 is a vertical sectional view through a water inlet means according to the present invention taken on the offset line 2—2 of FIGURE 3;

FIGURE 3 is a plan view on a reduced scale of the delivery device of FIGURE 2; and FIGURE 4 is a detail sectional view on the line 4—4 of FIGURE 2.

The swimming pool according to the present invention is more or less diagrammatically shown in FIGURE 1 at 11 as comprising a tank 12 of any desired configuration and formed, for example, of reinforced concrete cast in forms or gunited, or built up of preformed bricks or blocks. The bottom of the pool or tank at 13 is shown with a horizontal portion 14 and an inclined portion 15. A water outlet is indicated at 16, adjacent the top of the pool, where it may also serve to skim the surface. Water outlets may be located at one or more lower levels in the tank 12 and may be spaced about the periphery of the tank, if desired, depending upon the circulatory pattern selected for the water in the pool. Water from the outlet 16 is fed by a pump 17 through suitable conduit 18 to a conventional pool water filter 19 from whence it is returned to the pool through the conduit line 21. Line 21 connects with a header 22 embedded in the bottom 23 of the tank 12 and communicating with water inlets 24 for the returning filtered water.

A water inlet 24 is shown in plan in FIGURE 3, and in section in FIGURES 2 and 4, and includes a top inverted-dish-shaped plate 25 having a pair of lugs 26 depending therefrom. Nozzle passages 27 extend through the lugs 26 and terminate at their outer ends in nozzle orifices 28. As shown in FIGURES 2 and 3, the water inlet employs a pair of nozzle orifices 28 spaced substantially 180 degrees apart for symmetry. It will be understood that only a single nozzle may be used, or any number of nozzles spaced about the periphery of the inlet.

Integrally connected to the plate 25 and the lugs 26 is a depending, centrally located cup-shaped support 31 having a cylindrical wall 32 and a bottom wall 33 defining a chamber 34 communicating with the nozzle passages 27 in the lugs 26. Surrounding the cup-shaped portion 31 of the water inlet is a generally cylindrical jacket 35 providing a chamber 36 about the cup-shaped portion 31 and communicating with the chamber 34 thereof through staggered openings 37 in the cylindrical wall 32. Each chamber 36 is connected to the common header pipe 22 through individual conduits 38.

The jacket 35 has a depending hub 39, integral therewith, providing an internal cup-shaped recess 41 communicating with the chamber 36. Centrally of the hub 39 is secured a hollow, stationary shaft 42 by threading at 43 or by any other desired mode of attachment. The rotor of the filtered water inlet represented by the plate 25, the lugs 26, and the cup-shaped portion 31 is supported upon the stationary shaft 42 within the jacket 35 and is maintained thereon by a top nut 44 threaded on the upper end of the shaft 42. A washer 45 constituting a thrust bearing is disposed between the bottom surface of the nut 44 and the top surface of the plate 25.

The rotor of the water inlet is supported upon and rotates relative to the stationary shaft 42 at the bearing surfaces 46 and 47. Rotary seals are disposed between the rotating cup-shaped portion 31 and the stationary jacket 35 at 48 and 49, so as to prevent direct passage of the water from the filter into the pool from the chamber 36 and into the recess 41.

The hollow shaft 42 is provided with a transverse opening 51 beneath the bottom 33 of the cup-shaped portion 31 so as to communicate the recess 41 with the water in the pool through the hollow shaft. This places the pressure within the recess 41 at the same value as the water pressure on the top of the plate 25 and lessens the upward thrust on the inlet rotor by the incoming water pressure.

As shown in the plan view of FIGURE 3, the nozzles provided by the nozzle passages 27 and nozzle orifices 28 are offset from the axis of the rotor and the shaft 42, as at 52 and 53, so that the reaction forces resulting from the ejection of the incoming water from the nozzles exert a turning moment upon the rotor to effect rotation thereof. The water exiting from the nozzle orifices 28 thus takes a generally spiral path in its entrance into the pool which serves to intimately mix it with the water in the pool. The inlet nozzles are disposed immediately adjacent the bottom of the pool, as in FIGURES 1 and 2, and direct the incoming water in a plane substantially parallel to the bottom surface of the pool and in contact therewith. As this incoming water moves across the bottom surfaces of the pool, as at 14 and 15, it will wash and stir up any sediment or foreign materials settled to the bottom of the pool and place it again in suspension in the pool water so that it will be drawn off through the outlet 16, conduit 18, and pump 17 to the filter 19, where it will be removed.

Where the surface of the pool bottom is inclined, as at 15, the shaft 42 is preferably located at right angles to the bottom surface, as shown in FIGURE 1, so that the incoming filtered water will tend to remain in contact with the bottom of the pool to effect washing thereof.

In addition to its cleaning function by which the foreign matter suspended in the pool water is prevented from settling onto the bottom surface of the pool, or is washed or stirred up therefrom and placed again in suspension if it has already settled to the bottom, the rotary inlet according to the present invention has obvious advantages in securing more rapid and uniform mixing of the incoming water and of chemicals therein with the water in the pool. For the latter purposes, a heater and a chemical injection trap may be placed in the line 21, these elements being conventional and not shown in the drawing since their presence in the pool system is optional.

It will be further apparent that the cleaning area covered by each water inlet will be determined by the velocity of the incoming water from the filter 19, which will in turn be controlled by the capacity of the pump 17 and the loss in head through the conduit system. These will be related to the spacing between the water inlets so as to substantially cover the bottom surface of the pool with washing currents of incoming water to effect the cleaning and mixing actions.

While a certain preferred embodiment of the invention has been specifically shown and described, it is understood that the invention is not limited thereto, as many variations will be apparent to those skilled in the art, and the invention is to be given its broadest interpretation within the terms of the following claims.

I claim:

1. In a water circulating apparatus, a swimming pool; a circulatory system including a water outlet located above the pool bottom for taking water from the pool and a water inlet returning water to the pool; a filter in said circulatory system for removing suspended material from the water passing therethrough; a pump for circulating pool water through said filter from said outlet to said inlet; means connecting said filter and pump in series between said water outlet and inlet, said water inlet including a rotary nozzle disposed adjacent to the bottom of the pool and positioned to direct the incoming water across and in substantial contact with the bottom surface in washing relation; and means for rotating said nozzle about an axis substantially perpendicular to the bottom surface of the pool.

2. In a water circulating apparatus, a swimming pool; a circulatory system including a water outlet located above the pool bottom for taking water from the pool and a water inlet returning water to the pool; a filter in said circulatory system for removing suspended material from the water passing therethrough; a pump for circulating pool water through said filter from said outlet to said inlet; means connecting said filter and pump in series between said water outlet and inlet, said water inlet including a rotary nozzle disposed adjacent to the bottom of the pool and positioned to direct incoming water across and in substantial contact with the bottom surface in washing relation; and means mounting said nozzle for rotation about a transverse axis perpendicular to the bottom surface of the pool with the axis of the nozzle offset from said axis of rotation to effect rotation of the nozzle by the forces of reaction to the ejection of water therefrom.

3. In a water circulating apparatus, a swimming pool; a circulatory system including a water outlet located above the pool bottom for taking water from the pool and a water inlet returning water to the pool; a filter in said circulatory system for removing suspended material from the water passing therethrough; a pump for circulating pool water through said filter from said outlet to said inlet; means connecting said filter and pump in series between said water outlet and inlet, said water inlet comprising a substantially inverted-dish-shaped upper plate and a nozzle means therebeneath adjacent the bottom surface of said pool to direct streams of incoming water generally radially of the plate and closely adjacent to and parallel to the bottom surface of the pool in substantial contact therewith so as to wash the same; and means mounting said nozzle means for rotation about an axis substantially perpendicular to the bottom surface.

4. In a swimming pool, a circulatory system including a water outlet taking water from the pool and a water inlet returning water to the pool; a filter in said circulatory system for removing suspended material from the water passing therethrough; a pump for circulating pool water through said filter from said outlet to said inlet; means connecting said filter and pump in series between said water outlet and inlet, said water inlet comprising a substantially inverted-dish-shaped upper plate and a plurality of nozzle means therebeneath adjacent the bottom surface of said pool to discharge and to direct streams of incoming water generally radially of the plate and closely adjacent to and parallel to the bottom surface of the pool in substantial contact therewith so as to wash the same; and means mounting said nozzle means for free rotation about an axis substantially perpendicular to the bottom surface, the discharge axes of said nozzle means being offset from the axis of rotation thereof, said nozzle means being rotated by the turning moments created by the forces of reaction of the discharge of water therefrom.

5. In a swimming pool, a circulatory system including a water outlet taking water from the pool and a water inlet returning water to the pool; a filter in said circulatory system for removing suspended material from the water passing therethrough; a pump for circulating pool water through said filter from said outlet to said inlet; means connecting said filter and pump in series between said water outlet and inlet, said water inlet comprising a substantially inverted-dish-shaped upper plate and a plurality of nozzle means therebeneath adjacent the bottom surface of said pool to direct streams of incoming water generally radially of the plate and closely adjacent to and parallel to the bottom surface of the pool in substantial contact therewith so as to wash the same; means mounting said plate and nozzle means for the rotation about an axis substantially perpendicular to the bottom surface, the discharge axes of said nozzles being offset from the axis of rotation thereof whereby the forces of reaction to the ejection of the water create turning moments to effect rotation of said nozzle means; a cup-shaped support depending from said plate and having its interior communicating with said nozzle means; a cylindrical jacket surrounding said cup-shaped support with a chamber communicating with the interior of the support through openings in the wall thereof; and means connecting said jacket chamber to the outlet of said filter.

6. In a swimming pool, a circulatory system including a water outlet taking water from the pool and a water inlet returning water to the pool; a filter in said circulatory system for removing suspended material from the water passing therethrough; a pump for circulating pool water through said filter from said outlet to said inlet; means connecting said filter and pump in series between said water outlet and inlet, said water inlet comprising a substantially inverted-dish-shaped upper plate and a plurality of nozzle means therebeneath adjacent the bottom surface of said pool to direct streams of incoming water generally radially of the plate and closely adjacent to and parallel to the bottom surface of the pool in substantial contact therewith so as to wash the same; means mounting said plate and nozzle means for free rotation about an axis substantially perpendicular to the bottom surface, the discharge axes of said nozzle means being offset from the axis of rotation thereof whereby the forces of reaction to the ejection of the water create turning moments to effect rotation of said nozzle means; a cup-shaped support depending from said plate and having its interior communicating with said nozzle means; a cylindrical jacket surrounding said cup-shaped support with a chamber communicating with the interior of the support through openings in the wall thereof; means connecting said jacket chamber to the outlet of said filter; a hollow shaft mounted in said jacket at the bottom thereof and rotatably supporting said plate, nozzles, and cup-shaped support; and means communicating the space between the bottom of said cup-shaped support and the bottom of said jacket with the pool water through said hollow shaft so as to relieve the bottom of said support from the pressure of the incoming water to lessen the upward thrust on the rotating members.

References Cited by the Examiner
UNITED STATES PATENTS

| | | | |
|---|---|---|---|
| 1,563,851 | 12/1925 | Hartman | 210—169 |
| 1,862,906 | 6/1932 | Preleuthner | 259—96 |
| 2,592,904 | 4/1952 | Jackson | 259—8 |
| 2,596,191 | 5/1952 | Windholm | 239—264 |
| 2,990,011 | 6/1961 | Stratford | 239—224 |
| 3,018,491 | 9/1962 | Read | 4—178 |
| 3,045,829 | 7/1962 | Rule et al. | 4—178 |
| 3,077,306 | 2/1963 | Herzog | 239—264 X |

REUBEN FRIEDMAN, *Primary Examiner.*

HERBERT L. MARTIN, *Examiner.*

D. M. RIESS, C. R. REAP, *Assistant Examiners.*